F. L. IRWIN.
DUMP CAR.
APPLICATION FILED MAY 26, 1911.
1,028,941.
Patented June 11, 1912.
2 SHEETS—SHEET 1.
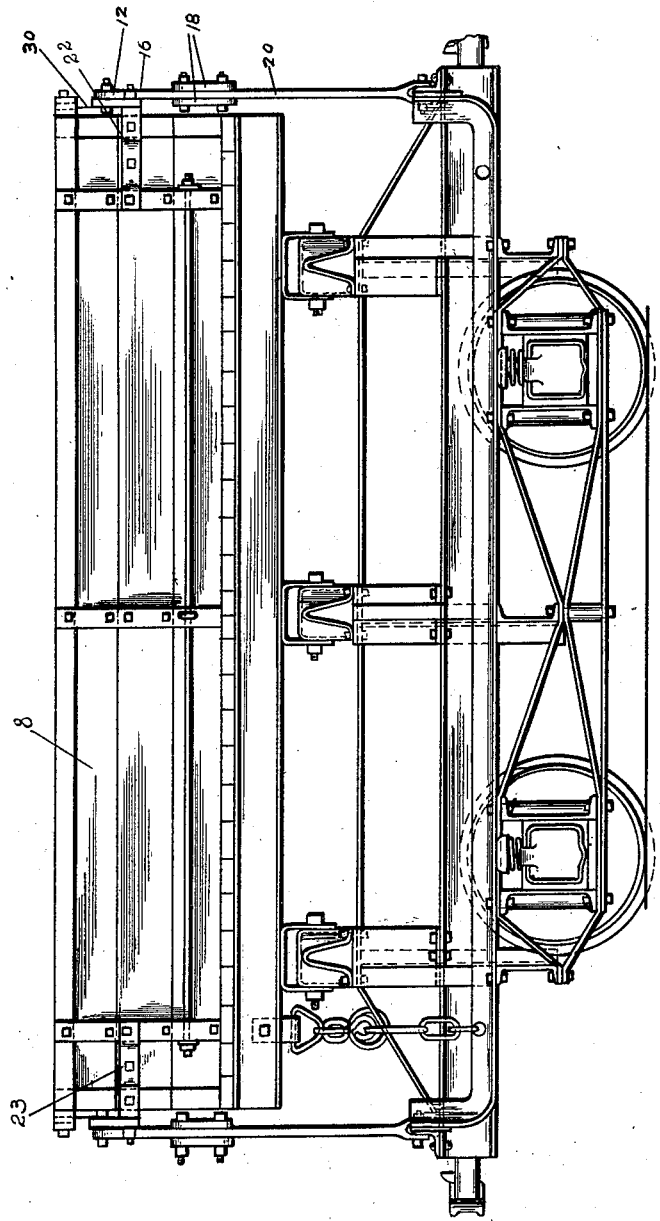
WITNESSES:
Frank L. Irwin INVENTOR.
BY
ATTORNEY.

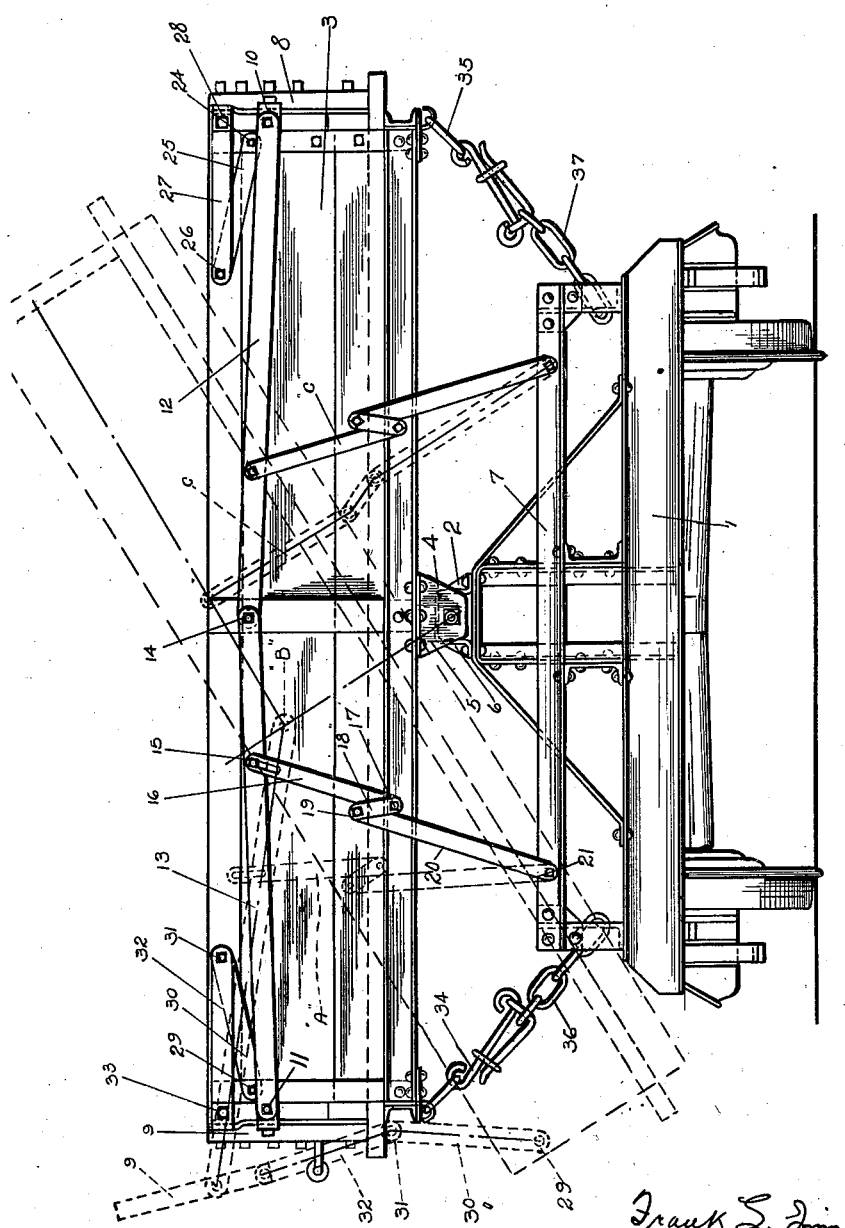

UNITED STATES PATENT OFFICE.

FRANK L. IRWIN, OF COLUMBUS, OHIO, ASSIGNOR TO THE RALSTON STEEL CAR COMPANY, OF COLUMBUS, OHIO, A CORPORATION OF OHIO.

DUMP-CAR.

1,028,941.  Specification of Letters Patent.  Patented June 11, 1912.

Application filed May 26, 1911. Serial No. 629,715.

*To all whom it may concern:*

Be it known that I, FRANK L. IRWIN, a citizen of the United States, residing at Columbus, in the county of Franklin and State of Ohio, have invented certain new and useful Improvements in Dump-Cars, of which the following is a specification.

My invention relates to improvements in dump cars, and is especially adapted to use with a car body mounted on a central longitudinal pivot adapted to swing laterally and discharge the lading through the sides thereof; to permit the discharge and also to hold the lading in place during the transportation, swinging doors or gates are provided, and it is to the matter of operating these doors that my invention is directed.

The invention includes a system of toggles or pivotally connected links united with the car body and to the underframe and with the swinging gate or displaceable side of the car body in such manner that when the car body is dumped the gate or door on one side thereof is lifted to clear the car body, thus permitting the discharge of the lading on that side, while the door on the opposite side of the car body, which side is elevated, remains in position.

The specific construction will be hereinafter set forth in detail; in the drawings hereto attached and hereby made a part of this specification, Figure 1 is a side view of the car having my improvements thereon; Fig. 2 is an end view of the car showing my improvements in place thereon.

Referring to the drawings, 1 is the truck of a car having the support 2 for the car body 3 built up thereon, the pivot shaft 4 passing through the brackets 5 and 6, thereby providing a pivot about which the car body may rotate for the purpose of dumping the lading and returning to normal position. The underframe of the car has the transverse member 7 thereon to which the links and chains hereinafter described are secured.

The car body comprises the bed or receptacle portion 3, mounted on the pivot 4 in a central longitudinal line, and the gates or sides 8 and 9, which are constructed to swing away from the car body on the side of the car on which the dumping takes place. Pivotally secured to the end of the doors 8 and 9 at 10 and 11 respectively are the arms 12 and 13, which at their inner ends have the common pivot 14; the arm 13 is pivotally associated at 15 with the link 16, which in turn is pivotally connected at 17 to the link 18, the latter being in turn pivotally connected at 19 to the link 20 which is pivotally mounted at 21 on the transverse member 7. This plurality of links is so constructed that it is extensible and contractible, the contracted position being shown in heavy lines in Fig. 2, and the extended position being shown in dotted lines on the right hand side of the center of the car in the same figure. The arms 12 and 13 at their ends 10 and 11 are pivotally secured to members 22 and 23 (see Fig. 1) mounted on the side of the door or gate member 8, and extending beyond the ends thereof.

The links 16 and 20 are united by the link 18, which always lies at an angle therewith, whether the link construction is folded or closed, or is in extended position, as shown in Fig. 2. Therefore the links are easily opened from a folded position, and readily closed when in an open position, through their normal operation, without requiring any manual manipulation thereof before operation.

Pivotally mounted upon the car body at 24 is a link 25 pivotally associated at 26 with the link 27, the latter being pivotally secured at 28 to the upper end of the door or gate 8; on the opposite side of the car body, corresponding parts are shown in the pivot 29, the link 30, the pivot 31, the link 32, and the pivotal connection for the link 32 at 33; these parts operate to rotate or swing the door 9 on the pivot 11 as appears in the dotted lines in Fig. 2, when the car body is dumped as there illustrated.

The car body carries the chain members 34 and 35 which are adapted to be connected with the corresponding chain members 36 and 37 carried by the underframe of the car, in the usual manner.

The operation is as follows, referring to Fig. 2: Assume that the car body is to be dumped toward the left; the chains 35 and 37 will be disconnected, and power applied to the right hand side of the car to tilt the same; in tilting, the car body 3 will be lowered on the left hand side, the link connection between the transverse member 7 and the arm 13 retaining the door in its elevated position. In the tilting operation, the link 16 with its connections will move into the position shown in the dotted lines generally at "A", the door being held aloft by the arm 13, the point of connection of which with the body of the car has correspondingly moved to the dotted position shown at "B." The links 30 and 32, in the downward travel of the car body have been brought into the dotted position shown in Fig. 2 and indicated by the same numerals as the parts in their normal position. The effect of the action of the associated links and arms is to move and swing the door to the position shown conventionally in dotted lines at 9 on the lowered side of the car body, the construction shown generally at "C" on the opposite side of the car being extended as shown in dotted lines to accommodate the links to the elevated position of the body on that side of the car. Thus the door is maintained in elevated position and swung away from the car body by the associated link members, and the lading is freely discharged. When the car is righted, the links 30 and 32 are folded on each other to resume the position shown in heavy lines in Fig. 2, while the arm 13, being moved inwardly by the arc-wise movement of its pivot point 14, operates to draw or return the door to its normal position as shown in heavy lines in said Fig. 2.

The construction of the car may admit of some changes, and I do not therefore desire to be confined to the specific construction shown, but desire to have the advantage of all variations and construction which lie within the scope of the appended claims.

What I claim is:

1. In a dump car having doors thereon, an arm pivotally mounted at one end upon the body of said car and pivotally connected at its other end with said door, a plurality of links pivotally connected and pivotally mounted at one end upon the body of said car, and at the other end pivotally connected with the door, and a plurality of links pivotally connected together and pivotally united at one end to said arm and at the other end to the underframe of said car.

2. In a dump car, a car body, an arm pivotally mounted thereon, a door pivotally connected with said arm, a plurality of pivotally connected links associated with said arm and with the underframe of said car to maintain said door in an elevated position, and a plurality of links pivotally connected together and mounted pivotally at one of their ends upon the body of said car and pivotally connected at their other end with said door, whereby said door is lifted away from said car body on the side of the car which is lowered during the dumping operation.

3. In a dump car having a car body and an underframe construction, an arm pivotally mounted at one end upon said car body, a door pivotally associated with the other end of said arm, a link construction pivotally connected with said underframe and said arm to maintain said door in an elevated position on the side of the car which is lowered during the dumping operation, and a link construction pivotally connected with the car body and with said door to swing the door when the car body recedes therefrom or approaches thereto.

In testimony whereof I affix my signature in the presence of two witnesses.

FRANK L. IRWIN.

Witnesses:
 W. E. WEEKS,
 B. L. STARNER.

---

Copies of this patent may be obtained for five cents each, by addressing the "Commissioner of Patents, Washington, D. C."